J. G. Hovey,
Pump Lift,
Nº 51,183.
Patented Nov. 28, 1865.

Witnesses
R. S. Campbell
E. Schafer

Inventor:
J. G. Hovey
by his att'ys
Mason, Fenwick

UNITED STATES PATENT OFFICE.

J. G. HOVEY, OF WAVERLY, IOWA.

IMPROVEMENT IN PUMPS.

Specification forming part of Letters Patent No. 51,183, dated November 28, 1865.

*To all whom it may concern:*

Be it known that I, J. G. HOVEY, of Waverly, in the county of Bremer and State of Iowa, have invented a new and Improved Pump; and I do hereby declare that the following is a full, clear, and exact description thereof, reference being had to the accompanying drawings, making a part of this specification, in which—

Figure 1:
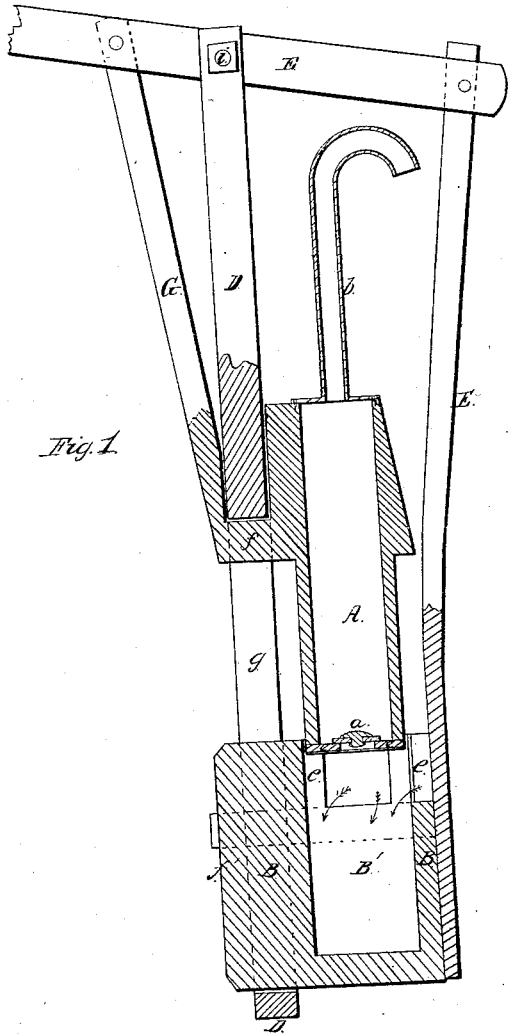
Figure 2:
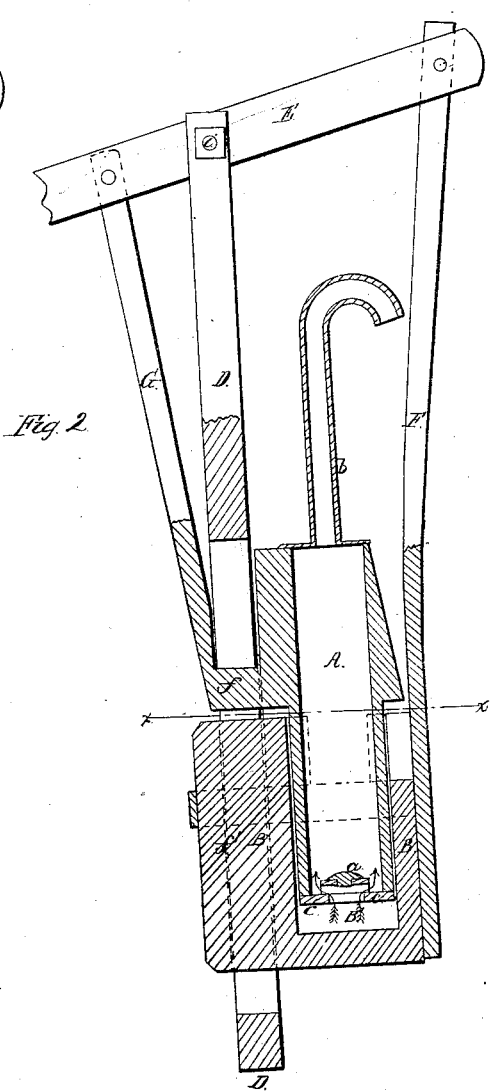
Figure 3:
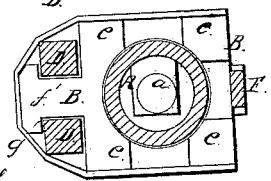

Figure 1 is a vertical elevation and section through my improved pump, representing the plunger in an elevated position. Fig. 2 is a similar view representing the plunger in a depressed position. Fig. 3 is a section through the pump taken in the horizontal plane indicated by red line $x\ x$.

Similar letters of reference indicate corresponding parts in the several figures.

This invention consists in constructing a force-pump with a hollow discharging piston or plunger having a valve in its bottom opening upward and a discharge-pipe at its top, and combining such a plunger with a vessel having an open top in such manner that when the plunger is elevated to its fullest extent the top of the vessel will be exposed to receive water, and when the plunger is again depressed this water will be forced into it and through the discharge-pipe, as will be hereinafter described.

My invention also consists in a novel mode of guiding and operating the plunger and cylinder of a pump, which has a reciprocating open-top cylinder and a discharging-piston, as will be hereinafter described.

To enable others skilled in the art to understand my invention, I will describe its construction and operation.

In the accompanying drawings, A represents the pen-stock, which may be made cylindrical or square. I prefer to construct it, as represented in the drawings, with a lower cylindrical portion terminating in an upper retangular head. This pen-stock is made hollow, and it is provided with a valve, $a$, in its lower end, which opens upward, and a discharge-pipe, $b$, projecting from its upper end above the top of the well. If desirable, the lower end of the pen-stock may be provided with a packing, $c$, of leather or other suitable material.

The cylindrical portion of the pen-stock works in a chamber, B', which is made in a movable portion, B, somewhat after the manner of a piston and cylinder pump, but with this difference: the chamber B' has no valves applied to it, and receives water from the well through its upper end, which is opened when the pen-stock is elevated to its fullest extent, as shown in Fig. 1. The pen-stock works snugly in the chamber B', and when it is raised above the upper end thereof the extensions $e\ e$ of the portion B keep the pen-stock in a proper position to enter the chamber B' again.

When the pen-stock A is elevated, as will be hereinafter explained, it forms a partial vacuum in the chamber B', and as this chamber should be submerged in the water of the well, the water will rush rapidly into the chamber and fill it. Then upon depressing the pen-stock the water in said chamber will be forced through the valve-opening in the pen-stock and up through the discharge-pipe $b$. When the pen-stock ceases to descend the valve $a$ will be suddenly closed by the weight of the column of water above it. The pen-stock A and the chambered portion B are both constructed with grooved extensions $f\ f'$, which are received and guided by the vertical slot, $g$, through the supporting-beam D, as shown in Figs. 1 and 2. This beam is suitably arranged within the well and secured therein in a vertical position, so as to constitute a support as well as a guide for the working parts of the pump. The lever E is pivoted to the upper end of the supporting-beam D, at $i$, and the extremity of the short arm of this lever or pump-handle is pivoted to a rod, F, the lower end of which is rigidly secured to the chambered portion B, as shown in Figs. 1 and 2.

The pen-stock A is connected to the long arm of lever F by means of a rod, G, which is pivoted at one end to said lever and secured rigidly at the other end to the pen-stock. By thus connecting the parts A and B to the lever E, it will be seen that they will alternately approach and recede from each other when the lever is vibrated, hence these parts need not be moved more than half the distance to give full strokes to them, which it would require if only one of them moved.

The beam D serves as a fulcrum for the pump-lever E, and also as a guide for keeping the axis of the pen-stock always coincident with that of the chamber within which it works.

One of the chief objects of my invention is to so contrive a force-pump having but one valve that it can be easily and cheaply made by an ordinary carpenter. There need not be any metal employed in its construction, consequently it will be found especially useful as a stock-pump to farmers and others, who can by my invention make their own pumps and keep them in good working order for very little expense.

The provision which I make to move the pen-stock A and chambered portion B simultaneously in opposite directions to each other is very important when employed in conjunction with the chamber B', which only receives water at its upper end, as these parts can thus be kept submerged when the water of the well is very low.

Having thus described my invention, what I claim as new, and desire to secure by Letters Patent, is—

1. The central-discharging pen-stock A, furnished with a valve, $a''$, and working in a chamber, B', which is adapted for receiving its water at the upper end when the pen-stock is elevated, substantially as described.

2. The combination of the movable chambered portion B, movable penstock A, with the connecting-rods F G, lever E, and vertical guide D, substantially as described.

J. G. HOVEY.

Witnesses:
E. G. EVANS,
DAVID CLARK.